(12) United States Patent
Luo et al.

(10) Patent No.: US 11,434,731 B1
(45) Date of Patent: Sep. 6, 2022

(54) IN-SITU METHANE EXPLOSION SHAPED CHARGE PERFORATING DEVICE WITH MOLECULAR SIEVE

(71) Applicant: China University of Mining and Technology, Xuzhou (CN)

(72) Inventors: Ning Luo, Xuzhou (CN); Cheng Zhai, Xuzhou (CN); Hanliang Liang, Xuzhou (CN); Yunchen Suo, Xuzhou (CN); Xiaolong Cao, Xuzhou (CN); Yishuo Yuan, Xuzhou (CN); Yabo Chai, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 17/685,932

(22) Filed: Mar. 3, 2022

(30) Foreign Application Priority Data

Mar. 5, 2021 (CN) .......................... 202110245811.8

(51) Int. Cl.
| | |
|---|---|
| *E21B 43/117* | (2006.01) |
| *E21B 43/247* | (2006.01) |
| *C09K 8/592* | (2006.01) |

(52) U.S. Cl.
CPC .......... *E21B 43/117* (2013.01); *E21B 43/247* (2013.01); *C09K 8/592* (2013.01)

(58) Field of Classification Search
CPC ...... E21B 43/11; E21B 43/116; E21B 43/117; E21B 43/1185; E21B 43/26; E21B 43/247; C09K 8/592; C01B 17/04; B01D 53/22
See application file for complete search history.

(56) References Cited

U.S. PATENT DOCUMENTS

| | | | | |
|---|---|---|---|---|
| 2,824,620 | A * | 2/1958 | De Rosset .............. | C01B 3/505 95/56 |
| 2007/0131415 | A1* | 6/2007 | Vinegar .................. | E21B 43/24 166/272.6 |
| 2010/0089574 | A1* | 4/2010 | Wideman ................. | E21B 7/18 166/308.1 |
| 2011/0056362 | A1* | 3/2011 | Yang ..................... | E21B 43/117 102/307 |
| 2012/0261123 | A1* | 10/2012 | Lourenco .............. | E21B 43/168 166/272.3 |
| 2014/0182843 | A1* | 7/2014 | Vinegar .............. | E21B 43/2401 166/250.01 |

(Continued)

*Primary Examiner* — Yong-Suk (Philip) Ro
(74) *Attorney, Agent, or Firm* — WPAT, PC

(57) ABSTRACT

An in-situ methane explosion shaped charge perforating device with a molecular sieve is provided and includes a body, an end of the body is fixedly connected to the molecular sieve, two sides of the molecular sieve are fixedly connected to two baffles respectively, each baffle is embedded with several first check valves inside, an end of the body far away from the molecular sieve is fixedly connected to a fixing plate, a center of the fixing plate is embedded with an ignition device, a bottom of the fixing plate is embedded with a concentration sensor, a portion of the fixing plate between the ignition device and the concentration sensor is formed with an air extracting hole, inner walls of a top and a bottom of the body are symmetrically embedded with second check valves, and the ignition device and the concentration sensor are electrically connected to an external controller.

7 Claims, 1 Drawing Sheet

(56) References Cited

U.S. PATENT DOCUMENTS

| | | | |
|---|---|---|---|
| 2015/0247385 A1* | 9/2015 | Chen | E21B 43/164 166/259 |
| 2015/0260020 A1* | 9/2015 | Benson | E21B 29/00 166/55.2 |
| 2016/0186548 A1* | 6/2016 | Pantano | C09K 8/592 166/263 |
| 2016/0319644 A1* | 11/2016 | Ageev | E21B 43/006 |

* cited by examiner

IN-SITU METHANE EXPLOSION SHAPED CHARGE PERFORATING DEVICE WITH MOLECULAR SIEVE

TECHNICAL FIELD

The disclosure relates to the field of oil and gas well perforation in oilfields, and particularly to an in-situ methane explosion shaped charge perforating device with a molecular sieve.

BACKGROUND

At present, horizontal well staged fracturing technology is mainly used for shale gas wells, which improves the productivity of horizontal wells by increasing the stimulated reservoir volume (SRV). However, this technology is complex in process as well as high in water consumption (single well>10,000 cubic metres), and easily causes geological disasters, such as groundwater pollution and earthquake. Especially for the geological characteristics of shale gas in western China like deep and tight reservoirs with high stress difference, it is difficult to form the fracture network of hydraulic fracturing shale reservoirs, and high energy gas fracturing method has some disadvantages like poor safety of initiating explosive devices and small fracture expansion. Due to low porosity and low permeability of shale, at present the hole depth is generally small after single perforation of oil and gas wells, but there are higher technical requirements for multi-stage perforation.

In order to increase the depth of single perforation hole, the disclosure provides an in-situ methane explosion shaped charge perforating device with a molecular sieve, which is simple and environment-friendly to operate, enhances the continuous operation capability of shaped charge perforation for many times, and may realize revolutionary deep in-situ methane explosively fractures tectonic fissure of shale reservoir.

SUMMARY

An objective of the disclosure is to provide an in-situ methane explosion shaped charge perforating device with a molecular sieve, which is internally ignited for multistage shaped charge after screening out combustible gas by the molecular sieve, and thereby effectively solves the problems of the generally small perforation depth of single explosion and shaped charge perforation holes.

In order to achieve the above objective, the disclosure provides an in-situ methane explosion shaped charge perforating device with a molecular sieve, including a body. An end in the body is fixedly connected to a molecular sieve, the molecular sieve is configured to gather an in-situ methane in an external stratum into the body, two sides of the molecular sieve are fixedly connected to two baffles respectively, the two baffles are embedded with several first check valves inside, an end of the body far away from the molecular sieve is fixedly connected to a fixing plate, a center of the fixing plate is embedded with an ignition device, a bottom of the fixing plate is embedded with a concentration sensor, the fixing plate between the ignition device and the concentration sensor is formed with an air extracting hole, inner walls of a top and a bottom of the body are symmetrically embedded with several second check valves, and the ignition device and the concentration sensor are electrically connected to an external controller. The ignition device includes an ignition rod coaxially embedded in the fixing plate and the body.

In an embodiment, the ignition device includes an ignition rod coaxially embedded in the fixing plate and the body, an end of the ignition rod close to an inside of the body is higher than a horizontal position of the fixing plate, an end of the ignition rod far away from the inside of the body extends out of the body and is connected to a cable, the cable is electrically connected to the external controller.

In an embodiment, a side of the body close to the fixing plate is fixedly connected to a filter screen.

In an embodiment, the air extracting hole is electrically connected to the external controller through an air extraction device.

In an embodiment, the air extracting hole is embedded with a third check valve inside.

In an embodiment, the body is internally provided with a combustion improver.

In an embodiment, the second check valves are arranged corresponding to positions of perforating charges.

In an embodiment, an end of the body close to the molecular sieve is an opening, and an end of the body close to the fixing plate is closed.

The embodiments of the disclosure may mainly have the following beneficial effects.

The in-situ methane explosion shaped charge perforating device with a molecular sieve is arranged with the molecular sieve in the body to gather the in-situ methane in the external stratum into the body; the first check valves on both sides of the molecular sieve make the gas only enter the body, and the body is connected to the outside through the air extracting hole, the air extracting hole extracts air from the body to form a low-pressure area, the in-situ methane is rapidly desorbed and stored in the body, and the concentration detector in the body monitors the in-situ methane concentration in real time. When a certain concentration is reached, the in-situ methane is ignited and desorbed by the ignition device, then explodes in the body, and jets through second check valves to detonate other methane in the fracture to achieve shaped charge explosion perforation. The device gathers in-situ methane desorbed from underground into the body, further increases the depth of perforation by multistage shaped charge explosion, enhances the multiple continuous operation capability of shaped charge perforation, solves the problem of limited crack extension in conventional explosive fracturing, and has clean operation area.

BRIEF DESCRIPTION OF DRAWINGS

In order to clearly explain the embodiments of this disclosure or the technical solutions in the related art, the drawings needed in the embodiments are briefly introduced below. Obviously, the drawings in the following description are only some embodiments of this disclosure. For ordinary technicians in the field, other drawings may be obtained according to these drawings without paying creative efforts.

Description of reference signs: 1: body; 2: molecular sieve; 3: baffle; 4: first check valve; 5: fixing plate; 6: ignition rod; 7: cable; 8: concentration sensor; 9: air extracting hole; 10: second check valve; 11: filter screen; 12: third check valve; 13: combustion improver; and 14: in-situ methane.

DETAILED DESCRIPTION OF EMBODIMENTS

In the following, the technical solutions in the embodiments of the disclosure will be clearly and completely described with reference to the drawings in the embodiments of the disclosure. Obviously, the described embodiments are only part of the embodiments of this disclosure, not all of them. Based on the embodiments in the disclosure, all other embodiments obtained by ordinary technicians in the field without creative work are within the scope of protection of the disclosure.

In order to facilitate further understanding of the content, characteristics and functions of the disclosure, the detailed description is as follows with the accompanying drawings.

Figure 1:
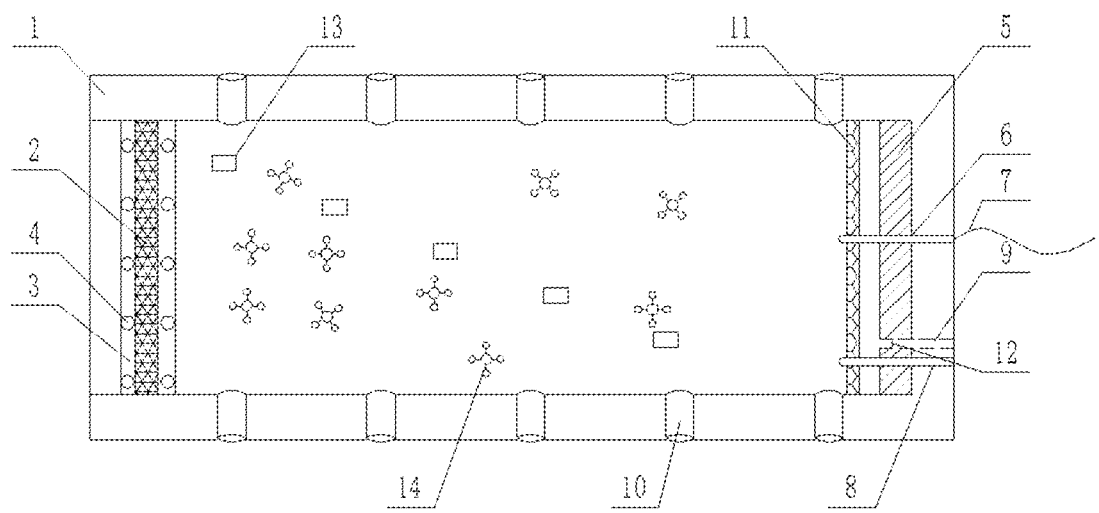
FIG. 1 shows a schematic structural diagram of an in-situ methane explosion shaped charge perforating device with a molecular sieve in the disclosure.
Figure 2:
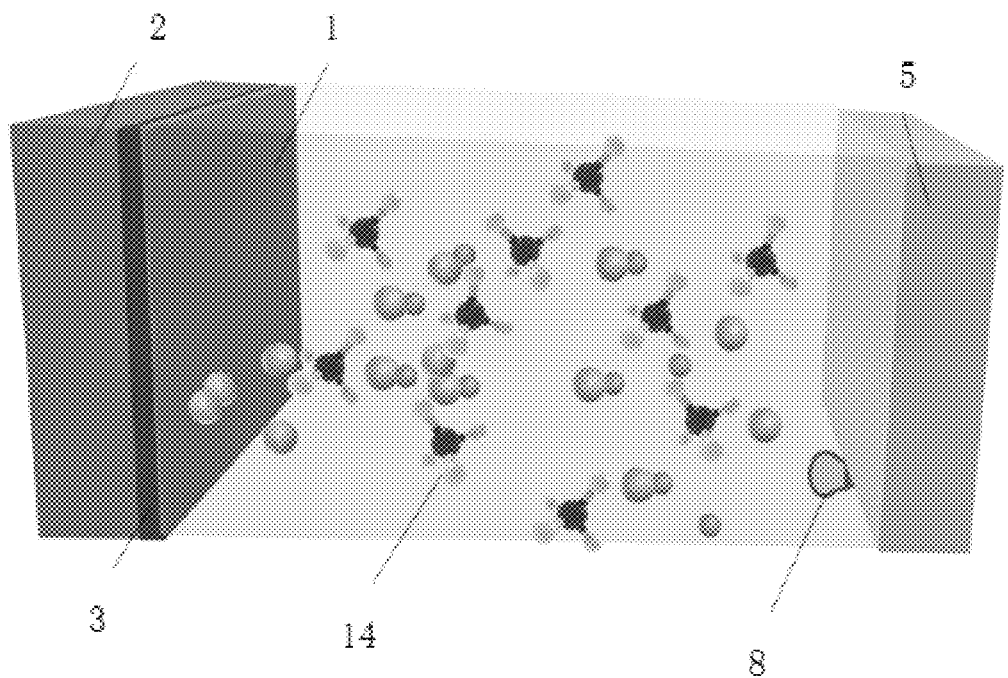
FIG. 2 shows a partial working schematic diagram of the in-situ methane explosion shaped charge perforating device with the molecular sieve in the disclosure.

As shown in FIG. 1 and FIG. 2, an in-situ methane explosion shaped charge perforating device with a molecular sieve includes a body 1, an end in the body 1 is fixedly connected to a molecular sieve 2, and the molecular sieve 2 can be mordenite molecular sieve or HZSM-5 molecular sieve. After adsorption on the molecular sieve 2, at least two combustible substances form and enter the body 1, one of them is in-situ methane 14. Two sides of the molecular sieve 2 are fixedly connected to two baffle 3 respectively, the two baffles 3 are embedded with several first check valves 4 inside, and only outside air may enter the body 1 through the first check valves 4. An end of the body 1 far away from the molecular sieve 2 is fixedly connected to a fixing plate 5, the fixing plate 5 is welded in the body 1, and a center of the fixing plate 5 is embedded with an ignition device for igniting the in-situ methane 14 in the body 1. A bottom of the fixing plate 5 is embedded with a concentration sensor 8, the concentration sensor 8 may transmit the monitoring data to an external controller in real time, the fixing plate 5 between the ignition device and the concentration sensor 8 is formed with an air extracting hole 9, and the air extracting hole 9 is configured to extract the air in the body 1 to reduce the pressure in the body 1. At the same time, external gas may enter the body through the baffle 3, the molecular sieve 2 and the baffle 3 in that order, the gas entering the body 1 is in-situ methane 14 and combustible molecules with smaller diameters than in-situ methane 14, and the combustible molecules passing through the molecular sieve 2 are all stored in the body 1. Inner walls of a top and a bottom of the body 1 are symmetrically embedded with several second check valves 10, only the combustible molecules in the body 1 may pass through the second check valves 10 to the outside, the first check valves 4 and the second check valves 10 are made of high-strength and high-rigidity materials, and the ignition device and the concentration sensor 8 are electrically connected to the external controller.

In an embodiment, the ignition device includes an ignition rod 6 coaxially embedded in the fixing plate 5 and the body 1, the ignition rod 6 is made of high-temperature resistant and anti-coking materials, an end of the ignition rod 6 close to an inside of the body 1 is higher than a horizontal position of the fixing plate 5, an end of the ignition rod 6 further away from the inside of the body 1 extends out of the body 1 and is connected to a cable 7, the cable 7 is electrically connected to the external controller, and the external controller sends out discharge signals, and the current is transmitted to the end of the ignition rod 6 close to the inside of the body 1 through the cable 7, and high-energy electric sparks are discharged.

In an embodiment, a side of the body 1 close to the fixing plate 5 is fixedly connected to a filter screen 11, and the filter screen 11 is configured to discharge the gas except in-situ methane 14 or other combustible molecules out of the body 1 through the air extracting hole 9.

In an embodiment, the air extracting hole 9 is electrically connected to the external controller through an air extraction device to extract the gas in the body 1.

In an embodiment, the air extracting hole 9 is embedded with a third check valve 12 inside. When the body 1 explodes, the third check valve 12 is closed by external control to prevent the air extracting hole 9 from being damaged.

In an embodiment, the body 1 is internally provided with a combustion improver 13 for promoting full explosion of in-situ methane 14 and other combustible molecules.

In an embodiment, the second check valves 10 are arranged corresponding to positions of perforating charges, so that the methane molecules may be sprayed out from the second check valves 10 after combustion and explosion, and then the methane gas in the surrounding cracks may be shaped and exploded, thereby realizing multistage explosion of in-situ methane 14.

In an embodiment, an end of the body 1 close to the molecular sieve 2 is an opening for the outside air to enter the body 1, and an end of the body 1 close to the fixing plate 5 is closed.

Working Principle:

After perforating underground by perforating charge, the combustion improver is put into the perforating area together with the device, and air extraction is carried out on the space by opening the first check valves 2 and closing the second check valves 10 and by opening the air extraction device through the external controller. Due to the separation of the molecular sieve 2 in the body 1, in-situ methane 14 may quickly flow into the body 1 from the fracture area with high concentration, and be collected in the body 1 quickly due to air extraction. The concentration sensor 8 detects the concentration of methane, and when the in-situ methane 14 reaches a certain concentration, the ignition rod 6 in the body 1 ignites the in-situ methane 14 in the body 1. At this time, the second check valves 10 are opened, the first check valve 2 is closed, in-situ methane 14 explodes in the body 1 and is sprayed out from the second check valves 10, and then the methane gas in the surrounding fissures is shaped and explodes to realize multistage explosion of in-situ methane 14.

In the description of this disclosure, it should be understood that the azimuth or positional relationship indicated by the terms "longitudinal", "transverse", "upper", "lower", "front", "rear", "left", "right", "vertical", "horizontal", "top", "bottom", "inner", "outer" and so on is based on the azimuth or positional relationship shown in the drawings for describing the disclosure, rather than indicating or implying that the device or elements must have a specific orientation, be constructed and operated in a specific orientation, so it cannot be understood as a limitation of the present disclosure.

Although the embodiments of the disclosure have been described with reference to the accompanying drawings, the disclosure is not limited to the above-mentioned specific embodiments, which are only illustrative and not restrictive, and ordinary technicians in the field may make more forms under the inspiration of the disclosure without departing from the purpose of the disclosure and the scope defined by the claims, all of which are within the scope of protection of the disclosure.

What is claimed is:

1. An in-situ methane explosion shaped charge perforating device with a molecular sieve, comprising:
   a body;
   the molecular sieve, fixedly connected to an end of the body, wherein the molecular sieve is configured to gather an in-situ methane in an external stratum into the body;
   two baffles, fixedly connected to two sides of the molecular sieve respectively;
   a plurality of first check valves, embedded in each of the two baffles;
   a fixing plate, fixedly connected to an end of the body far away from the molecular sieve;
   an ignition device, embedded in a center of the fixing plate;
   a concentration sensor, embedded in a bottom of the fixing plate, wherein the concentration sensor is configured to monitor a concentration of the in-situ methane in real time, and a portion of the fixing plate between the ignition device and the concentration sensor is formed with an air extracting hole; and
   a plurality of second check valves, symmetrically embedded in inner walls of a top and a bottom of the body;
   wherein the ignition device and the concentration sensor are electrically connected to an external controller; and
   wherein the ignition device comprises an ignition rod coaxially embedded in the fixing plate and the body, and the body is internally provided with a combustion improver.

2. The in-situ methane explosion shaped charge perforating device with the molecular sieve according to claim 1, wherein an end of the ignition rod close to an inside of the body is higher than a horizontal position of the fixing plate, an end of the ignition rod far away from the inside of the body extends out of the body and is connected to a cable, and the cable is electrically connected to the external controller.

3. The in-situ methane explosion shaped charge perforating device with the molecular sieve according to claim 1, further comprising: a filter screen, fixedly connected to a side of the body close to the fixing plate.

4. The in-situ methane explosion shaped charge perforating device with the molecular sieve according to claim 1, wherein the air extracting hole is electrically connected to the external controller through an air extraction device.

5. The in-situ methane explosion shaped charge perforating device with the molecular sieve according to claim 4, further comprising: a third check valve, embedded inside the air extracting hole.

6. The in-situ methane explosion shaped charge perforating device with the molecular sieve according to claim 1, wherein the plurality of second check valves are arranged corresponding to positions of perforating charges.

7. The in-situ methane explosion shaped charge perforating device with the molecular sieve according to claim 1, wherein an end of the body close to the molecular sieve is an opening, and an end of the body close to the fixing plate is closed.

* * * * *